United States Patent
Morris et al.

(10) Patent No.: US 11,550,370 B2
(45) Date of Patent: Jan. 10, 2023

(54) MODULAR DATA STORAGE SYSTEMS

(71) Applicant: Seagate Technology LLC, Fremont, CA (US)

(72) Inventors: Charles Morris, Longmont, CO (US); Kevin Van Pelt, Longmont, CO (US); Lon Stevens, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 116 days.

(21) Appl. No.: 17/084,928

(22) Filed: Oct. 30, 2020

(65) Prior Publication Data

US 2022/0137681 A1    May 5, 2022

(51) Int. Cl.
 *G06F 1/18* (2006.01)
 *G06F 1/16* (2006.01)

(52) U.S. Cl.
 CPC ............ *G06F 1/187* (2013.01); *G06F 1/1632* (2013.01)

(58) Field of Classification Search
 CPC ..... G06F 1/187; G06F 1/1632; G11B 33/128; G11B 33/125
 See application file for complete search history.

(56) References Cited

U.S. PATENT DOCUMENTS

| | | | |
|---|---|---|---|
| 6,424,526 B1 * | 7/2002 | Heard | G11B 33/128 361/679.48 |
| 6,826,456 B1 | 11/2004 | Irving et al. | |
| 6,950,895 B2 | 9/2005 | Bottom et al. | |
| 7,139,170 B2 | 11/2006 | Chikusa et al. | |
| 7,200,008 B1 | 4/2007 | Bhugra | |
| 7,359,186 B2 * | 4/2008 | Honda | G11B 33/142 361/679.33 |
| 7,375,923 B2 * | 5/2008 | DeCenzo | G11B 33/128 361/679.48 |
| 7,742,308 B1 | 6/2010 | King, Jr. et al. | |
| 7,933,120 B2 | 4/2011 | Tanaka et al. | |
| 8,045,328 B1 | 10/2011 | Chen | |
| 8,817,474 B2 | 8/2014 | Campbell et al. | |
| 8,838,286 B2 | 9/2014 | Florez-Larrahondo et al. | |
| 9,241,427 B1 | 1/2016 | Stevens et al. | |
| 9,763,350 B2 | 9/2017 | Rust et al. | |
| 9,820,409 B1 | 11/2017 | Ross et al. | |
| 9,832,088 B2 | 11/2017 | Myrah et al. | |
| 10,240,615 B1 | 3/2019 | Kho et al. | |
| 10,368,466 B1 | 7/2019 | Frink et al. | |

(Continued)

OTHER PUBLICATIONS

Activia, Specification sheet of D22060-TK, retrieved Mar. 29, 2020, https://www.activa.com.tw/products_DC_Axial_cooling_fan_D22060-T.html (2020).

(Continued)

*Primary Examiner* — James Wu
(74) *Attorney, Agent, or Firm* — Faegre Drinker Biddle & Reath LLP

(57) ABSTRACT

A system includes a data shuttle with rows of data storage devices, which are communicatively coupled to a shared printed circuit board assembly. Each row includes multiple data storage devices. The printed circuit board assembly is configured to communicatively couple to a first controller to enable storing data to the data storage devices and to communicatively coupled to a second controller to enable transferring data from the data storage devices.

20 Claims, 9 Drawing Sheets

(56) References Cited

U.S. PATENT DOCUMENTS

| | | |
|---|---|---|
| 10,390,462 B2 | 8/2019 | Curtis et al. |
| 2004/0008484 A1 | 1/2004 | Konshak et al. |
| 2004/0130868 A1 | 7/2004 | Schwartz et al. |
| 2007/0127207 A1 | 6/2007 | Katakura et al. |
| 2007/0233781 A1 | 10/2007 | Starr et al. |
| 2008/0174948 A1 | 7/2008 | Davis |
| 2009/0016019 A1 | 1/2009 | Bandholz et al. |
| 2009/0265045 A1 | 10/2009 | Coxe, III et al. |
| 2010/0033930 A1 | 2/2010 | Wada |
| 2012/0327597 A1 | 12/2012 | Liu et al. |
| 2014/0052807 A1 | 2/2014 | Lin et al. |
| 2014/0293523 A1 | 10/2014 | Jau et al. |
| 2014/0364048 A1 | 12/2014 | Milligan et al. |
| 2017/0112015 A1 | 4/2017 | Kang et al. |
| 2017/0235347 A1 | 8/2017 | Heyd et al. |
| 2017/0303428 A1 | 10/2017 | Hayashi et al. |
| 2018/0088813 A1* | 3/2018 | Agrawal ............... G06F 3/0623 |
| 2018/0235105 A1 | 8/2018 | Curtis et al. |
| 2020/0253084 A1 | 8/2020 | Van Pelt et al. |

OTHER PUBLICATIONS

Delta Electronics, Specification of AFB1548VH-CD8G, Jun. 19, 2017, retrieved from https://www.delta-fan.com/Download/Spec/AFB1548VH-CD8G.pdf (2017).

Morgan, Timothy Prickett, "Microsoft Azure Goes Back to Rack Servers with Project Olympus," The Next Platform, https://www.nextplatform.com/2016/11/01/microsoft-azure-goes-back-rack-servers-project-olympus/ (Nov. 1, 2016).

\* cited by examiner

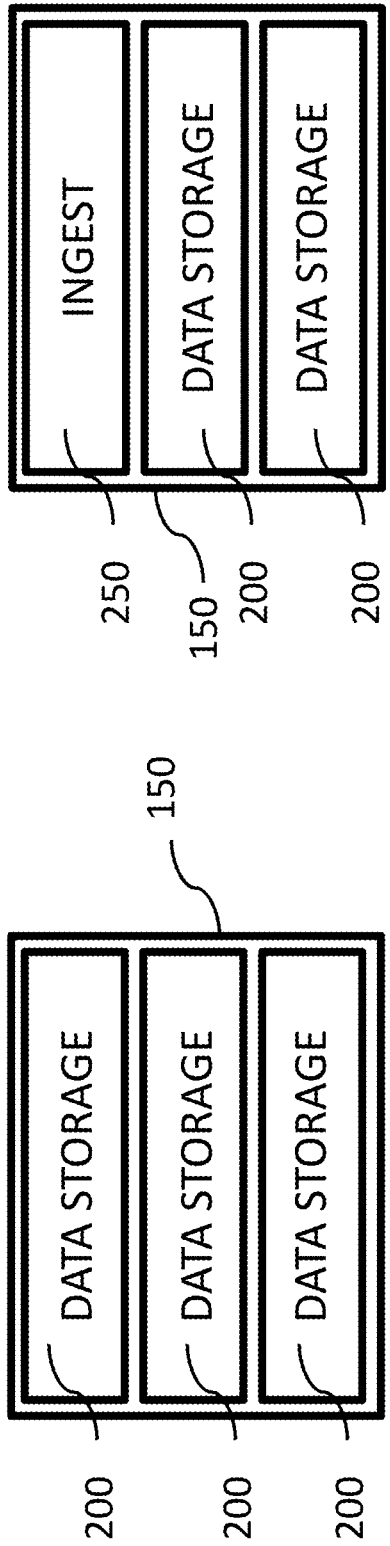
FIG. 5A
FIG. 5B
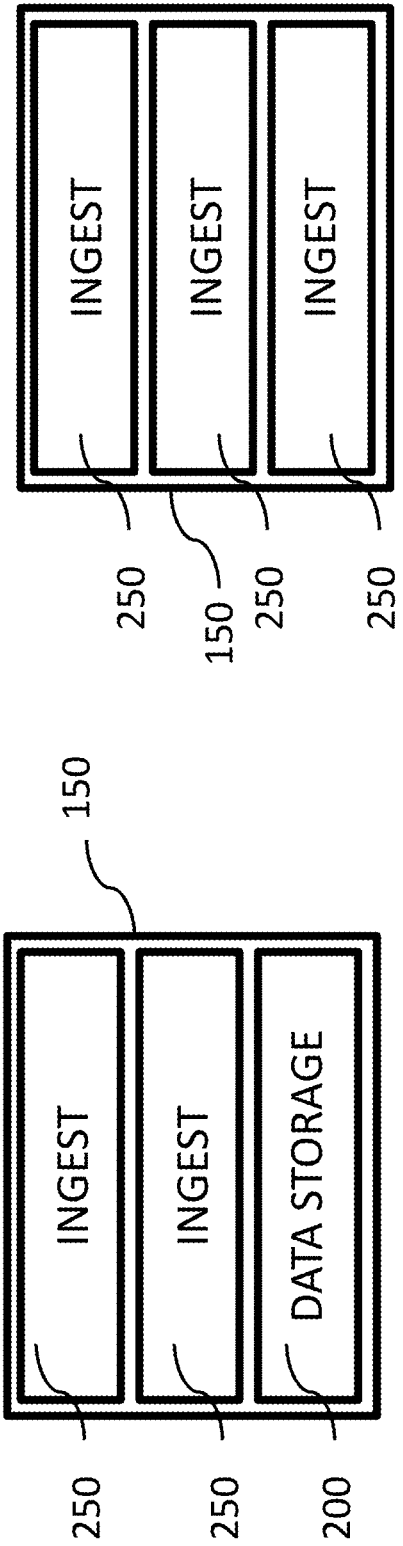
FIG. 5C
FIG. 5D

MODULAR DATA STORAGE SYSTEMS

In certain embodiments, a system includes a data shuttle with rows of data storage devices, which are communicatively coupled to a shared printed circuit board assembly. Each row includes multiple data storage devices. The printed circuit board assembly is configured to communicatively couple to a first controller to enable storing data to the data storage devices and to communicatively coupled to a second controller to enable transferring data from the data storage devices.

In certain embodiments, a docking station includes a chassis including storage bays, data shuttles removably coupled to respective storage bays and including data storage devices, a latch movable between a latched position and an unlatched position, and a controller configured to check whether it is permissible to remove at least one of the data shuttles and to cause the latch to move from the latched position to the unlatched position.

In certain embodiments, a system includes a rack that houses multiple enclosures each of which includes multiple sub-enclosures. At least one of the enclosures has a high-density storage sub-enclosure, which includes data storage devices positioned along multiple levels and multiple rows. At least one of the enclosures has an ingest unit sub-enclosure with bays sized to removably couple to data shuttles. The ingest unit sub-enclosure includes a controller functionally positioned between the data shuttles and the other sub-enclosures. The controller is configured to transfer data from the ingest unit sub-enclosure to the data storage devices positioned in the high-density data storage sub-enclosure.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 5A-D show different arrangements of enclosures of the data storage system of FIG. 1, in accordance with certain embodiments of the present disclosure.

Figure 1:
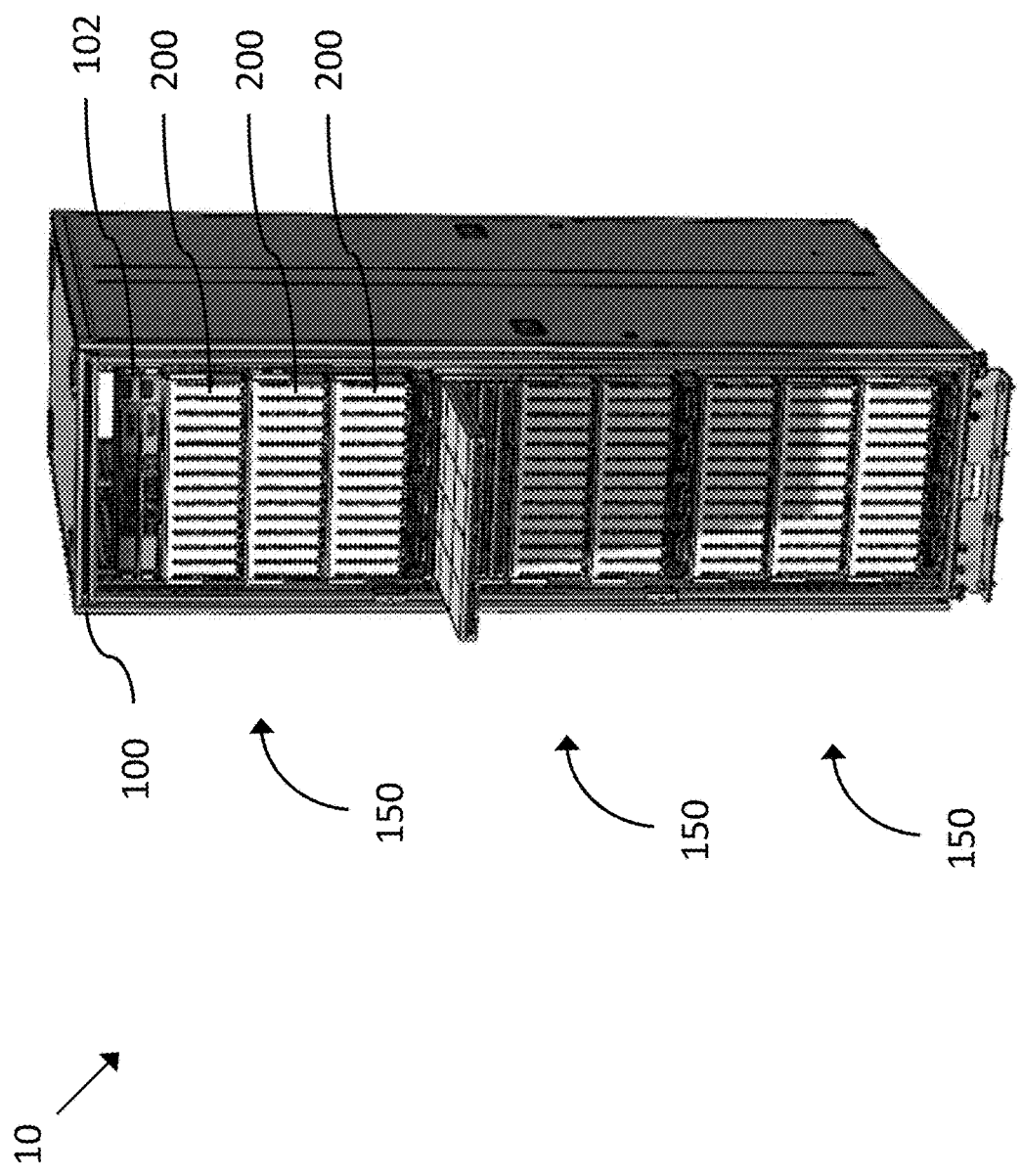
FIG. 1 shows a data storage system, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Certain embodiments of the present disclosure feature modular data storage systems. These data storage systems can house multiple enclosures and sub-enclosures each of which can contain different types of data storage equipment (e.g., high-density storage enclosures, data ingest units).

FIG. 1 shows a data storage system 10 including a rack 100 (e.g., a cabinet) with a plurality of enclosures 150, with three enclosures 150 shown in FIG. 1. Each enclosure 150 can include multiple sub-enclosures 200. For example, the enclosures 150 may be 12-unit enclosures (e.g., 12U enclosures) designed so that multiple sub-enclosures (e.g., up to 12 different 1U-sized devices) can fit into the enclosure 150. The enclosures 150 shown in FIG. 1 include three 4U-sized sub-enclosures 200. The enclosures 150 are modular such that the enclosures 150 can handle different types of sub-enclosures 200, which are described in more detail below. In certain embodiments, the rack 100 includes separate power shelfs 102 which house power supply units to power data storage devices, cooling units, and other electronics of the rack 100, enclosures 150, and/or sub-enclosures 200. The rack 100 can further house various network switching devices and/or servers. For example, instead of including three 12U-sized enclosures, the rack 100 could include two 12U-sized enclosures and the remaining space in the rack 100 can be used to house additional power shelfs, network switching devices, and/or servers and the like.

Figure 2:
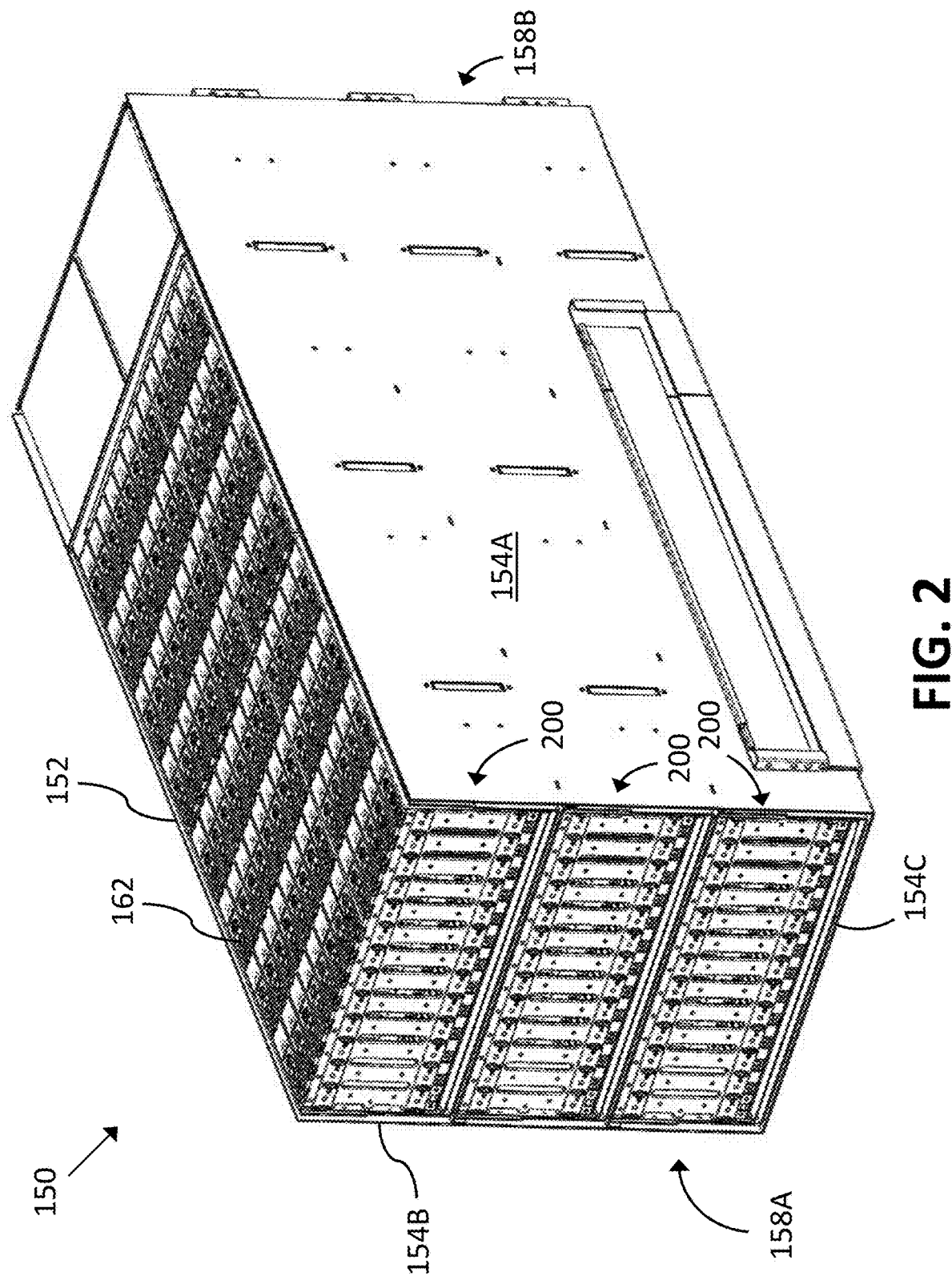
FIG. 2 shows a perspective view of an enclosure of the data storage system of FIG. 1, in accordance with certain embodiments of the present disclosure.
Figure 3:
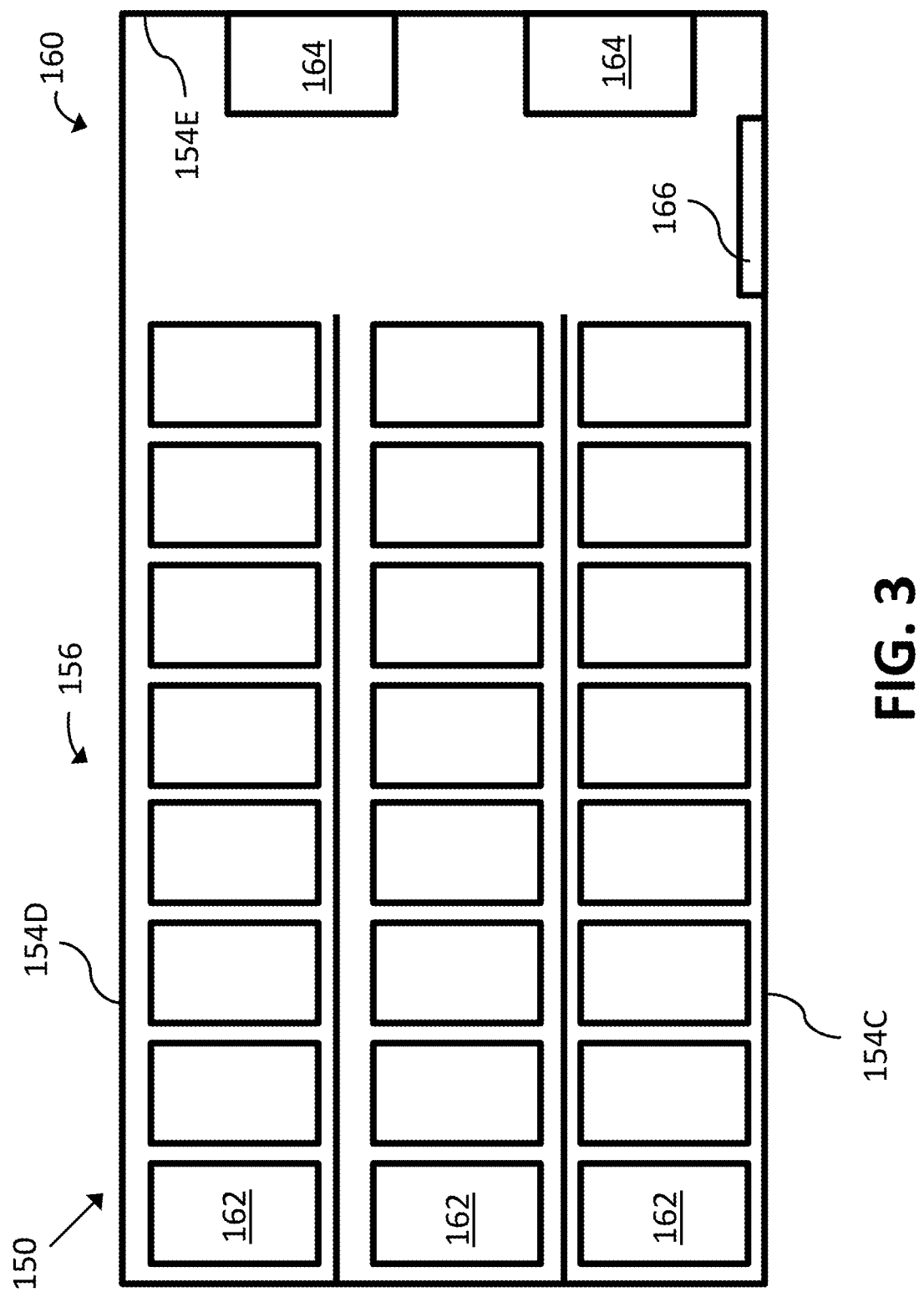
FIG. 3 shows a side cut-away view of the enclosure of FIG. 2, in accordance with certain embodiments of the present disclosure.

FIG. 2 shows one of the enclosures 150 with three sub-enclosures 200 of one type of sub-enclosure 200 (e.g., a high-density storage enclosure) that can be used with the data storage system 10. FIG. 3 shows a side cutaway view of the enclosure 150 of FIG. 2. FIG. 3 shows a back end of the enclosure 150.

The enclosure 150 includes a chassis 152 with a first side wall 154A, a second side wall 154B, a bottom wall 154C, a top wall 154D (shown in FIG. 3), and a back wall 154E (shown in FIG. 3). Each wall of the chassis 152 may be constructed of multiple wall components assembled together or by a single component (e.g., formed by one piece of sheet metal). The chassis walls can be made of metal (e.g., aluminum, steel) in the form of sheets of metal.

The enclosure 150 is separated into a data storage area 156 at a front end 158A of the enclosure 150 and a cooling area 160 at a back end 158B of the enclosure 150. As will be described in more detail below, the data storage area 156 is where the different types of sub-enclosures 200 can be positioned within the enclosure 150. The sub-enclosures 200 shown in FIGS. 2-4 include multiple rows of data storage devices 162.

Figure 4:
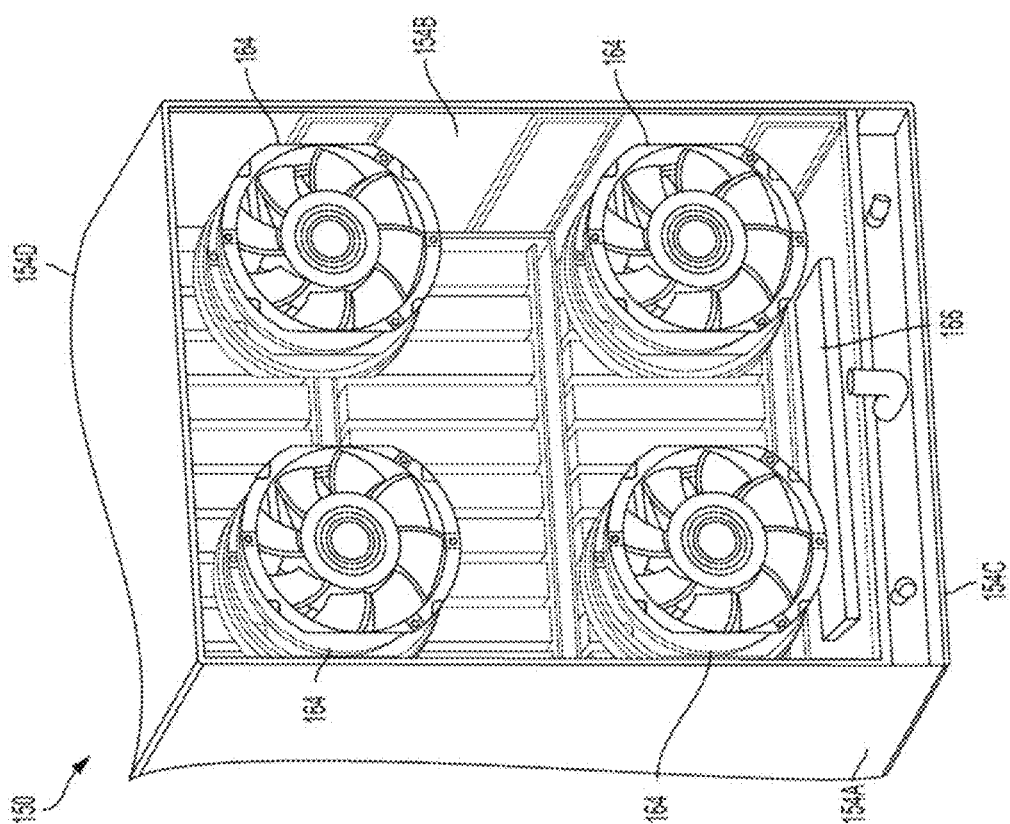
FIG. 4 shows a perspective view of a back end of the enclosure of FIGS. 2 and 3, in accordance with certain embodiments of the present disclosure.

As shown in FIG. 3, the enclosure 150 includes several air movers 164 (e.g., fan assemblies, radial or axial blowers) coupled to the back wall 154E of the enclosure 150. The air movers 164 are arranged to pull air from the front end 158A of the enclosure 150 towards the back end 158B of the enclosure 150 and exhausted from the enclosure 150. As the air moves within the enclosure 150, the air cools the various electronic devices positioned within the enclosure 150. As shown in FIG. 4, two of the air movers 164 are positioned at a height different and higher than the other two air movers 164 positioned in the enclosure 150.

As enclosures are more densely packed with data storage devices and/or other electronics (e.g., processors) and as such data storage devices and electronics generate more heat, enclosures require more cooling to maintain desired operating temperatures for the data storage devices and the electronics. Although adding more air movers to enclosures or increasing the speed at which air movers operate can provide improved cooling for enclosures, these approaches increase power consumption and increase the amount of acoustic energy generated by air movers and transmitted through the enclosure. As components of air movers rotate, the air movers generate acoustic energy (e.g., energy transmitted through air), which can affect the performance of data storage devices. When acoustic energy is transmitted to data storage devices, the data storage devices vibrate which affects their ability to write data and read data. For data storage devices that are hard disk drives, the vibration resulting from acoustic energy makes it difficult for the read/write heads in the hard disk drives to settle on or follow a desired data track for data reading and data writing operations. The risk of acoustic energy affecting performance increases as hard disk drives store more data per disk and therefore require finer positioning of the read/write heads. The performance impact on data storage devices in enclosures is particularly pronounced for data storage devices positioned closest to the air movers.

Instead of adding more air movers and/or increasing the operating speed of the air movers, the enclosure 150 of the present disclosure features air movers 164 that are "shared" among the multiple data storage devices 162 and among the sub-enclosures 200. The enclosure 150 includes fewer air movers 164 (e.g., four, six, eight) than conventional enclosures. For example, conventional systems typically use a dedicated set of air movers for each drawer. In such conventional arrangements, the enclosure includes at least two air movers for each drawer.

In certain embodiments of the present disclosure, the air movers 164 are positioned with respect to the sub-enclosures 200 such that the air drawn by air movers 164 is drawn from and across multiple sub-enclosures 200. As such, the air movers 164 are shared and not positioned to be dedicated to a drawer or data storage level. Using fewer air movers in an enclosure via sharing air movers among multiple sub-enclosures 200 can help reduce the total amount of acoustic energy generated by air movers in the enclosure.

The present disclosure features another approach for reducing acoustic energy, involving incorporation of larger-than-conventional air movers 164 in the enclosure 150. In arrangements with standard-sized sub-enclosures, there is limited space for fans thus limiting the size of the fans that can be used. For example, air movers in conventional enclosure arrangements are typically limited to being approximately 80 or fewer millimeters in diameter. In certain embodiments of the present disclosure, the air movers 164 can have diameters in a range such as 120-220 mm because the air movers 164 are not limited by the height of the sub-assemblies. For example, the diameter of the air movers 164 can be larger than the heights of the respective sub-enclosures 200. Larger air movers can operate at lower speeds to satisfy a given cooling need requirement as compared to smaller air movers. For example, a smaller air mover may need to operate at 15,000 rpm to provide the same cooling effect as a larger air mover operating at 7,000 rpm. As such, in certain embodiments of the present disclosure, the air movers 164 can operate in ranges such as 5,000-10,000 rpm (e.g., 6,000-8,000 rpm) as opposed to the higher operating speeds (e.g., 12,000 rpm, 15,000 rpm) required when using smaller-diameter fan assemblies. As noted above, reducing the amount of acoustic energy can decrease performance degradation of the data storage devices 162 positioned within the enclosure 150.

The present disclosure features another approach for reducing the impact of acoustic energy, by positioning the air movers 164 farther away from the data storage devices 162 than conventional enclosures. In conventional enclosure, air movers are positioned as close as one or two inches from data storage devices. With the air movers 164 positioned farther from the data storage devices 162, less of the acoustic energy generated by the fans impacts the data storage devices 162. In certain embodiments of the present disclosure, the air movers 164 are positioned five to six inches (as measured along a longitudinal axis of the enclosure 150) from the data storage devices 162. As a result, there is a space between the air movers 164 and the data storage devices 162 that is greater than conventional enclosure. At least part of the space can be filled with one or more acoustic baffles to further attenuate the amount of acoustic energy that impacts the data storage devices 162. Further, some or all of the surfaces in the space can be covered by an acoustic absorptive material 166 (e.g., non-metal materials such as cloth fabrics and porous polymer-based materials such as polyurethane-based foam). The acoustic absorptive material 166 can attenuate the acoustic energy generated by the air movers 164.

As noted above, the enclosures 150 can be modular such that they can house different types of sub-enclosures 200 and multiple sub-enclosures 200. For example, as shown in FIGS. 2, 3, and 5A, one or more of the enclosures 150 can include sub-enclosures 200 that are all high-density storage sub-enclosures that can store data across the data storage devices 162 that are positioned close to each. As other examples, as shown in FIGS. 5B and 5C, one or more of the enclosures 150 can include sub-enclosures 200 that include a combination of high-density storage sub-enclosures and ingest units, which are described in more detail below and which are separately noted with reference number 250. As another example, as shown in FIG. 5D, one or more of the enclosures 150 can include sub-enclosures 200 that are all ingest units 250. Further, a rack 100 can include different combinations of the enclosures shown in FIGS. 5A-D. For example, the lower and upper enclosures 150 in the rack 100 shown in FIG. 1 include three high-density sub-enclosures 200 while the middle enclosure 150 in the rack 100 has two high-density sub-enclosures 200 and one ingest unit 250.

Figure 6:
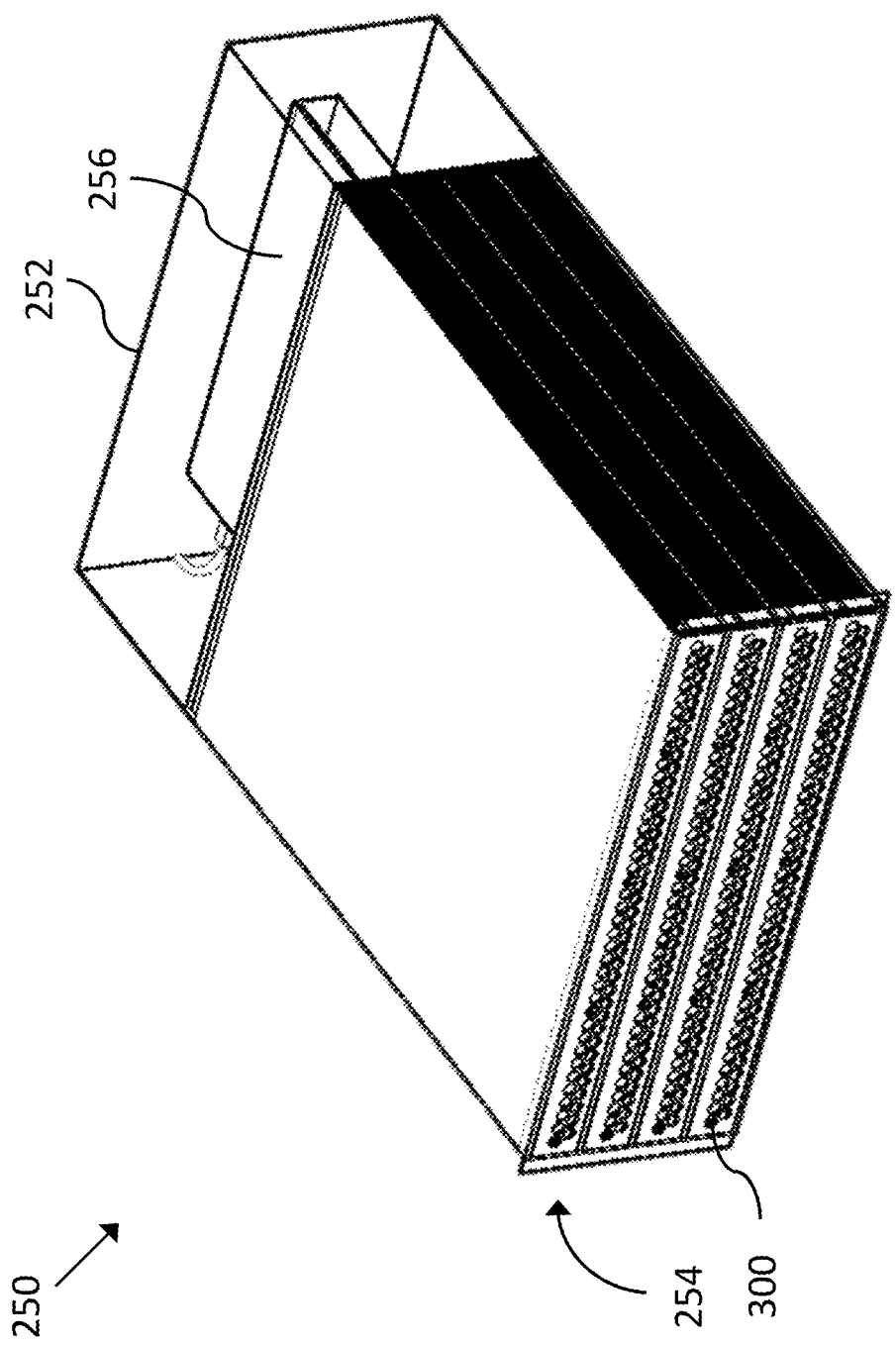
FIG. 6 shows a perspective view of an ingest unit, in accordance with certain embodiments of the present disclosure.

FIG. 6 shows an example of an ingest unit 250. The ingest unit 250 includes its own chassis 252 that is 4U-sized although the ingest unit 250 can be larger or smaller. The ingest unit 250 is sized to fit into the enclosure 150, and multiple ingest units 250 can be positioned into the enclosure 150.

The ingest unit 250 can include multiple bays 254 such as four 1U-shaped bays 254 shown in FIG. 6. The bays 254 are shaped to receive data shuttles 300, which are shown in more detail in FIG. 7 and described further below. The data shuttles 300 can store data at a remote location (e.g., a docking station connected to a local network as described in more detail below) and then shipped to another location (e.g., a data center with the data storage system 10) and then inserted into one of the bays 254 of the ingest unit 250. Data from the data shuttle 300 can then be transferred from the data shuttle 300 to one of the high-density sub-enclosures 200. The data shuttle 300 can then be removed from the ingest unit 250 to make space for another data shuttle. The removed data shuttle 300 can then be shipped to the same or another remote location to be reused.

The ingest unit 250 includes a controller 256 that is communicatively coupled to the data shuttles 300 positioned in the bays 254 of the ingest unit 250. The controller 256 is functionally positioned between the data shuttles 300 and the other sub-enclosures 250 of the data storage system 10. In certain embodiments, the ingest unit 250 includes only the single controller 256, which is shared among the multiple bays 254 and their respective data shuttles 300. Having a single controller 256 reduces cost and power usage of the ingest unit 250. Other functions of the controller 256 are described in more detail below.

Figure 7:
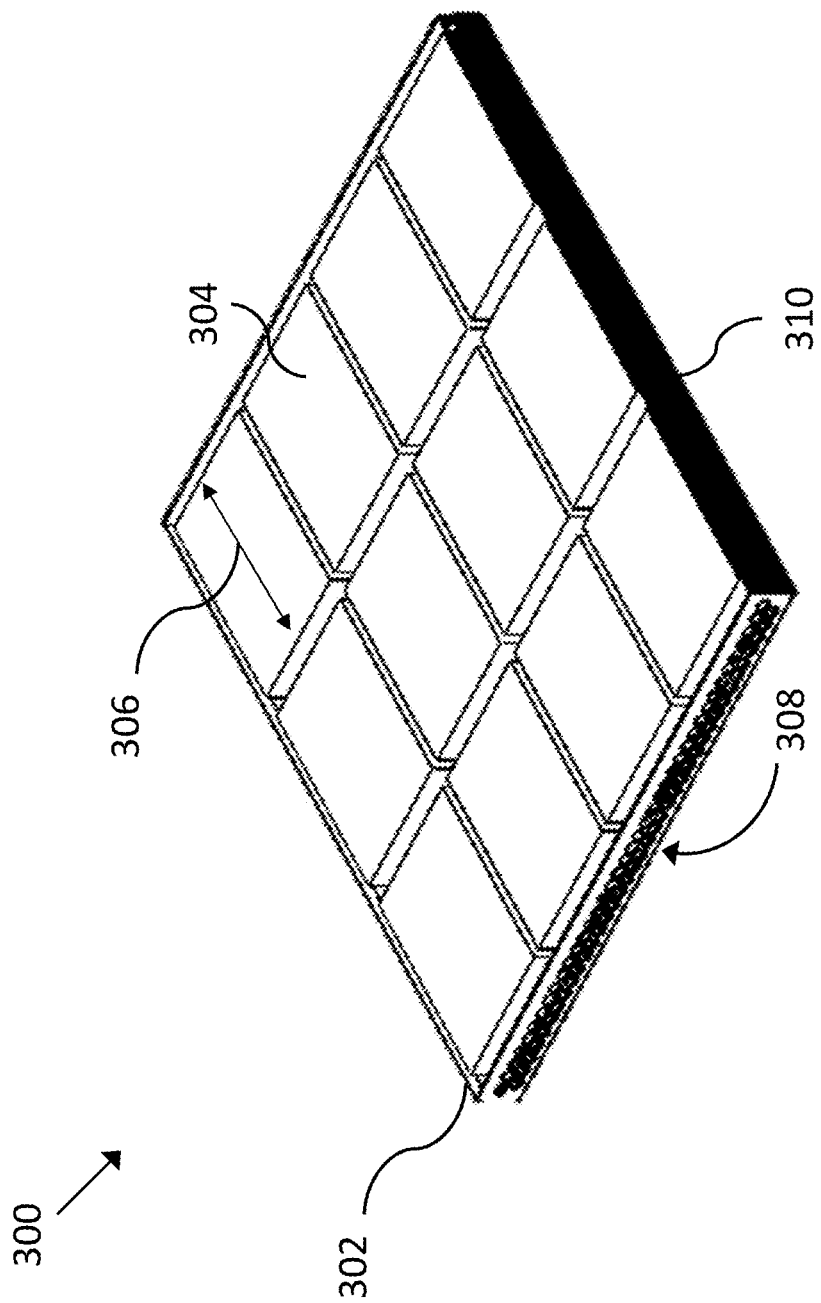
FIG. 7 shows a perspective view of a data shuttle, in accordance with certain embodiments of the present disclosure.

FIG. 7 shows an example of one of the data shuttles 300. The data shuttle 300 includes a chassis 302 that holds data storage devices 304. For example, the data shuttle 300 could include twelve 3.5-inch form factor hard disk drives (e.g., three rows with four hard disk drives in each row). As shown in FIG. 7, the data storage devices 304 can be positioned on a single level of the data shuttle. The data storage devices 304 can be arranged to lay flat such that longitudinal axes 306 of the data storage devices 304 are parallel to a plane along which a printed circuit board 308 extends. Put another way, the data storage devices 304 rest on one of their larger-area surfaces similar to a mattress on a bed spring or bed frame. The chassis 302 can be sized to fit into the ingest unit 250 and the docking stations 400/450 (shown in FIGS. 8 and 9). The chassis 302 can include or be coupled to rails 310 along sides of the chassis 302. In certain embodiments, to reduce the cost of the data shuttle 300, the rails 310 can comprise a material such as nylon that can slide along corresponding slides on the ingest unit 250 and the docking stations 400/450—as opposed to using ball bearings.

Further, to reduce cost, weight, fragility, and/or complexity, the data shuttle 300 does not necessarily include its own fans, power supply units, or controllers—although the data storage devices 304 themselves may each have one or more controllers. The data shuttle 300 may, however, include circuitry (e.g., one or more of the printed circuit boards 308 and their components) that provides power to the data storage devices 304 and that transfers data to and from the data storage devices 304. For example, the one or more printed circuit boards 308 can include connectors (e.g., standardized SATA or SAS connectors) that mechanically and electrically couple to respective data storage devices 304. The one or more printed circuit boards 308 can be shared among some or all of the data storage devices 304 to transfer power and data to the data storage devices 304.

As mentioned above, the data shuttle 300 may not include its own controller. Instead, the data shuttle 300 may include an interface (e.g., an electrical connector on the one or more printed circuit boards 308) that is designed to communicate with an interface of the ingest unit 250 and an interface of the docking stations 400/450 (shown in FIGS. 8 and 9). For example, the interface can facilitate communication of data between the data storage devices 304 and the controller of the ingest unit 250 and the controller of the docking stations 400/450. The corresponding interface of the ingest unit 250 and the controller of the docking stations 400/450 can be identical so that the data shuttle 300 can connect to and communicate with both the ingest unit 250 and the controller of the docking stations 400/450. As such, the ingest unit 250, the data shuttle 300, and the docking stations 400/450 can have a common interface.

Further, without the data shuttle 300 having its own controller, the data storage devices 304 on the data shuttle 300 may not communicate with each other. Instead, the data shuttle 300 may first need to be communicatively coupled to a controller of the ingest unit 250 or the docking stations 400/450 before the data storage devices 304 can communicate with each other.

As mentioned above, when the data shuttle 300 is inserted into the ingest unit 250, the controller of the ingest unit 250 can communicate with the data shuttle 300 to allow data stored to the data storage devise 304 to transfer to the ingest unit 250 and to high-density data storage sub-enclosures 200. For example, the controller of the ingest unit 250 may include memory that stores a digital key that enables data stored on the data storage devices 304 to be accessed for transfer from the data shuttle 300. The digital key can be used to decrypt or otherwise allow access to data stored on the data storage devices 304. As another example, the controller of the docking stations 400/450 may include memory that stores a digital key that enables data to be stored on the data storage devices 304 of the data shuttle 300.

Without a controller on each data shuttle 300, the overall cost of the data shuttle 300 and the data storage system 10 can be reduced. Instead of having a controller on each data shuttle 300, the controllers of the ingest unit 250 and of the docking stations 400/450 can control data transfers to and from the data storage devices 304 of the data shuttle 300. For example, the ingest unit 250 can include a single controller that supports four data shuttles 300 (e.g., one data shuttle 300 for each bay 256 of the ingest unit 250), and the docking stations 400/450 can include a single controller that supports two or more data shuttles 300 (e.g., one data shuttle 300 for each bay of the docking stations 400/450).

Figure 8:
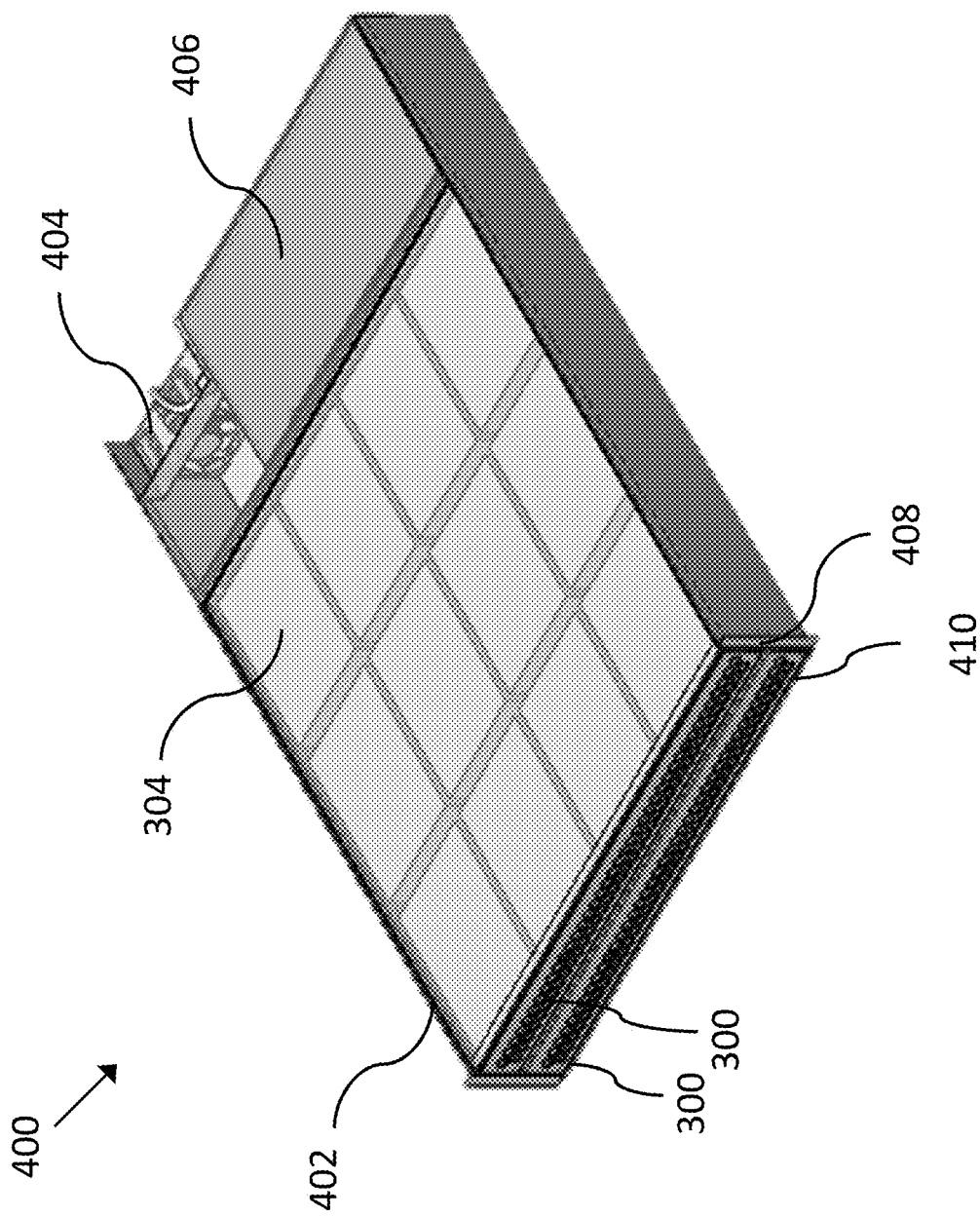
FIG. 8 shows a perspective view of a docking station, in accordance with certain embodiments of the present disclosure.

FIG. 8 shows an example of a rack-mounted docking station 400. The docking station 400 can include a chassis 402. The docking station 400 shown includes two bays with data shuttles 300 positioned in each of the bays. The docking station 400 can include one or more air movers 404.

The docking station 400 includes a controller 406 that controls data transfers to and from the data storage devices 304 of the data shuttles 300. In certain embodiments, the controller 406 can control one or more latches 408 (e.g., electro-mechanical locks), which are arranged to prevent undesired or unpermitted removal of the data shuttles 300 from the docking station 400. For example, the controller 406 can be programmed to check (e.g., a readiness check) whether data transfer operations to the data storage devices 304 have completed before the one or more latches 408 are moved to a position in which the one or more data shuttles 300 can be removed from the docking station. This check can help prevent errors in writing data to the data storage devices 304 by avoiding removal of the data shuttle 300 before completion of data transfers.

In certain embodiments, the docking station 400 includes an externally-accessible button 410 that causes the controller 406 to perform the check and unlatch one or more of the data shuttles 300 so that they can be removed from the docking station 400.

Figure 9:
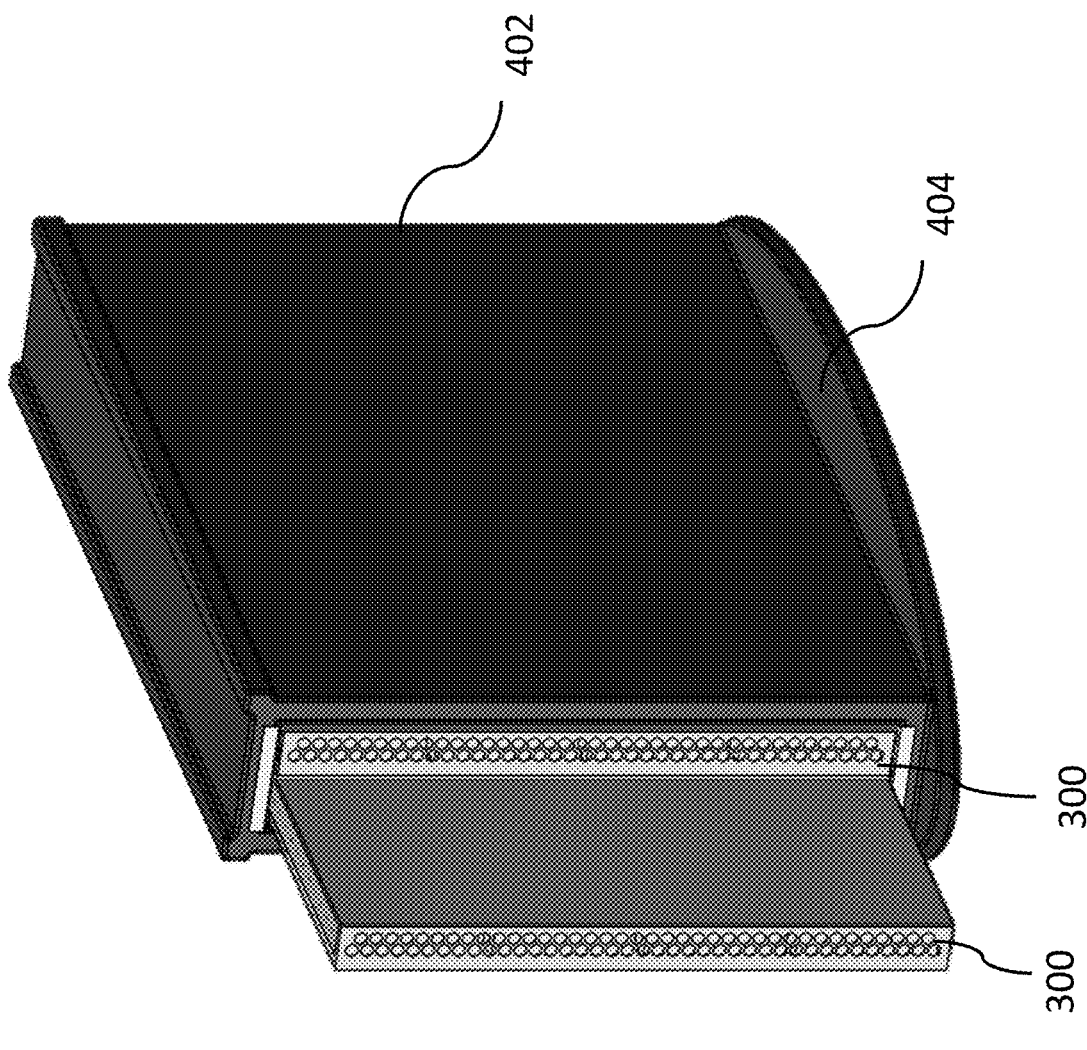
FIG. 9 shows a perspective view of another type of docking station, in accordance with certain embodiments of the present disclosure.

FIG. 9 shows an example of a pedestal-mounted docking station 450. The docking station 450 can be free-standing station as opposed to the rack-mounted docking station 400 shown in FIG. 9. The docking station 450 can include a chassis 402 and a pedestal 404 that supports the rest of the docking station 450 to help keep it upright. The docking station 400 shown includes two bays with data shuttles 300 positioned in each of the bays.

Like the rack-mounted docking station 400, the pedestal-mounted docking station 450 can include fan assemblies, a controller, and one or more latches. The controller can control data transfers to and from the data storage devices of the data shuttles 300 and can control the one or more latches.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A system comprising:
   an outer chassis including multiple storage bays;
   a data shuttle removably coupled to a first storage bay of the multiple storage bays and including rows of data storage devices, which are communicatively coupled to a shared printed circuit board assembly, wherein each row includes multiple data storage devices;
   a latch movable between a latched position and an unlatched position; and
   a controller programmed to check whether it is permissible to remove the data shuttle from the first storage bay by determining whether data transfer operations have completed and to cause the latch to move from the latched position to the unlatched position based on the determining.

2. The system of claim 1, wherein the data storage devices are positioned on a single level of the data shuttle.

3. The system of claim 2, wherein the data shuttle includes three rows of data storage devices and each row includes four data storage devices.

4. The system of claim 3, wherein the data storage devices are hard disk drives.

5. The system of claim 4, wherein the data storage devices are 3.5" form factor hard disk drives.

6. The system of claim 2, wherein the data storage device are arranged to minimize a height of the data shuttle.

7. The system of claim 1, wherein the data shuttle does not include its own controller positioned within the data shuttle.

8. The system of claim 1, wherein the data shuttle does not include an air mover positioned within the data shuttle.

9. The system of claim 1, wherein the data shuttle does not include a power supply unit positioned within the data shuttle to power the data storage devices.

10. The system of claim 1, wherein the data shuttle includes a chassis that is sized to fit into a docking station that is separate from the outer chassis.

11. The system of claim 1, wherein the data storage devices are not communicatively coupled to each other.

12. The system of claim 1, further comprising:
    a rack that includes sub-enclosures,
    at least one of the sub-enclosures is a high-density storage sub-enclosure, which includes a separate set of data storage devices positioned along multiple levels and multiple rows,
    at least one of the sub-enclosures is an ingest unit sub-enclosure with the multiple storage bays, the ingest unit sub-enclosure including a second controller functionally positioned between the data shuttle and the other sub-enclosures and configured to transfer data from the ingest unit sub-enclosure to the data storage devices positioned in the high-density data storage sub-enclosure.

13. The system of claim 12, wherein the high-density storage sub-enclosure is a 12U-sized enclosure.

14. The system of claim 13, wherein another one of the sub-enclosures comprises a second high-density storage sub-enclosure that includes a second 12U-sized enclosure.

15. The system of claim 14, wherein the ingest unit sub-enclosure comprises only four storage bays.

16. The system of claim 1, wherein the data storage devices rest on their respective larger area surfaces on an interior surface of the data shuttle.

17. The system of claim 1, wherein the data shuttle includes rails coupled to opposing sides of a chassis of the data shuttle.

18. The system of claim 17, wherein the rails comprise nylon.

19. The system of claim 1, further comprising a button configured to cause the controller to check whether it is permissible to remove the data shuttle from the first storage bay.

20. The system of claim 19, wherein the button is externally accessible.

* * * * *